United States Patent
Yu et al.

(10) Patent No.: US 6,591,194 B1
(45) Date of Patent: Jul. 8, 2003

(54) VERTICAL 1-D INVERSION WITH THIN LAYERS OF EQUAL THICKNESS

(75) Inventors: Liming Yu, Stafford, TX (US);
Berthold Kriegshäuser, Houston, TX (US); Otto Fanini, Houston, TX (US); Jiaqi Xiao, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 87 days.

(21) Appl. No.: 09/794,963

(22) Filed: Feb. 27, 2001

(51) Int. Cl.[7] .................................................. G01V 3/18
(52) U.S. Cl. .......................................................... 702/7
(58) Field of Search ................................. 702/7; 367/73

(56) References Cited

U.S. PATENT DOCUMENTS

| | | | |
|---|---|---|---|
| 5,329,448 A | 7/1994 | Rosthal | 364/422 |
| 5,656,930 A | 8/1997 | Hagiwara | 324/339 |
| 5,999,883 A | 12/1999 | Gupta et al. | 702/7 |
| 6,147,496 A | 11/2000 | Strack et al. | 324/343 |

OTHER PUBLICATIONS

Fan–Wei Yang et al.; Inversion of borehole normal resistivity logs, Geophysics, vol. 49, No. 9, Sep. 1984, pp. 1541–1548, 8 Figs., 3 Tables.

J. E. Simms et al.; Comparison of four least–squares inversion schemes for studying equivalence in one–dimensional resistivity interpretation, Geophysics, vol. 57, No. 10, Oct. 1992, pp. 1282–1293, 8 Figs., 1 Table.

Primary Examiner—Donald E. McElheny, Jr.
(74) Attorney, Agent, or Firm—Madan, Mossman & Sriram, P.C.

(57) ABSTRACT

Measurements made by a multicomponent logging tool in a borehole are inverted to obtain horizontal and vertical resistivities of a formation traversed by the borehole. The model includes layers of equal thickness, each layer having a horizontal resistivity and a vertical resistivity. For a vertical borehole, the inversion is done by first iteratively obtaining the horizontal resistivities of the layer using the $H_{zz}$ component of the data wherein in successive steps of the iteration, the horizontal resistivity for each layer is multiplied by a ratio of a model $H_{zz}$ output to the measured $H_{zz}$. The vertical resistivity model is set equal to the derived horizontal resistivities and the iterative process is repeated using the ratio of the model $H_{xx}$ output to the measured $H_{xx}$. A similar process is used for boreholes with a known inclination. For such an inclined borehole, the two horizontal components $H_{xx}$ and $H_{yy}$ are summed to give a horizontal measurement $H_{xxyy}$ that is independent of tool rotation. The first step uses a ratio of the model $H_{zz}$ output to the measured $H_{zz}$ data to obtain an apparent resistivity, and, in the second step, the ratio of the model $H_{xxyy}$ output and the measured $H_{xyy}$ data are used along with a known relationship between the apparent resistivity and the horizontal and vertical resistivities in an iterative manner. No Jacobians or gradients are necessary in the method, so that computational times are small relative to prior art gradient methods.

21 Claims, 8 Drawing Sheets

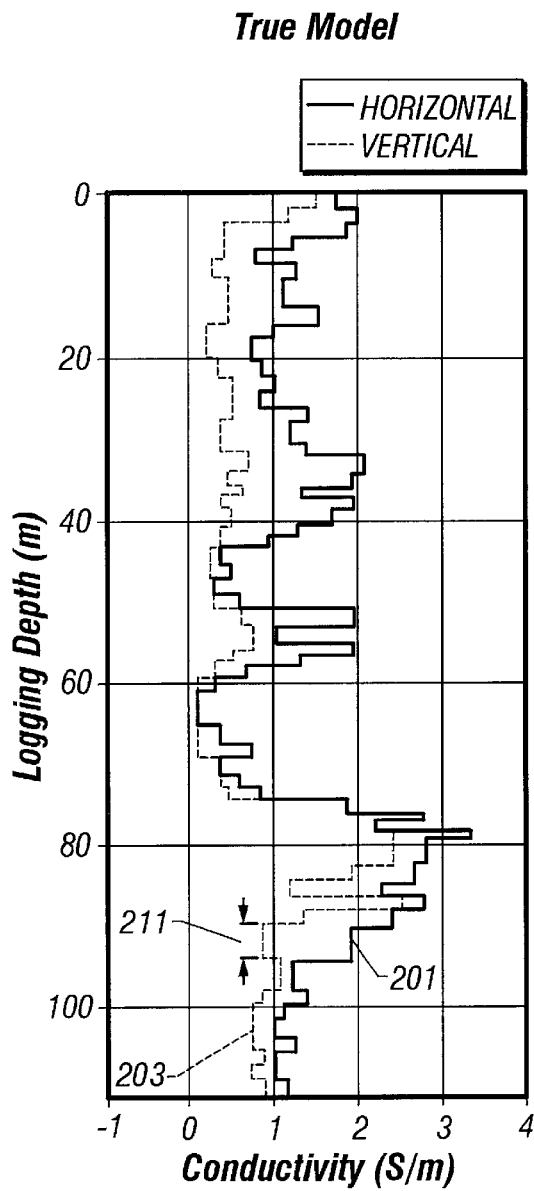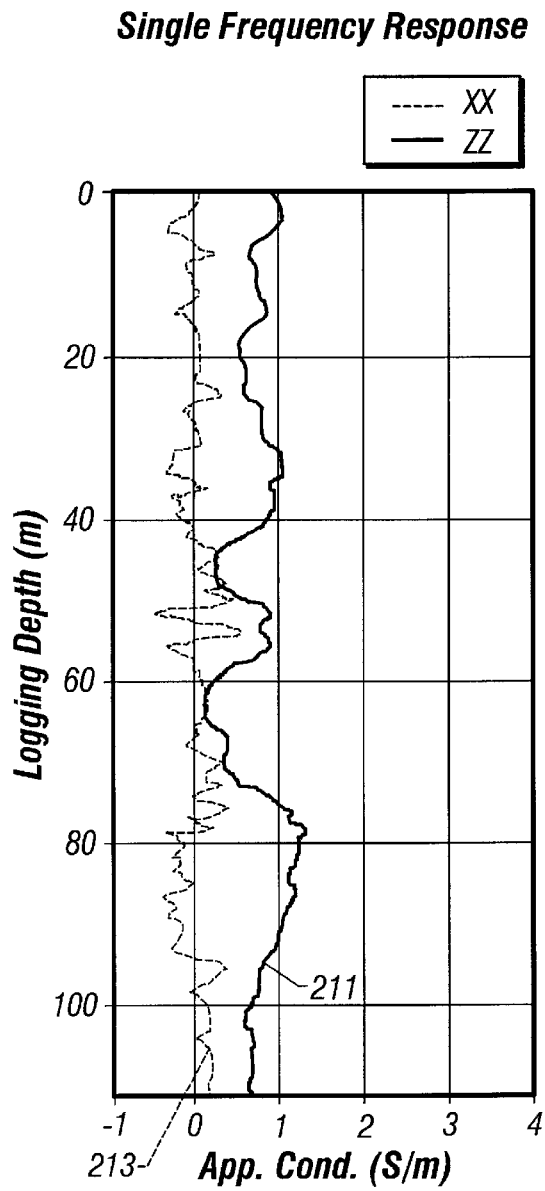
FIG. 3A
FIG. 3B

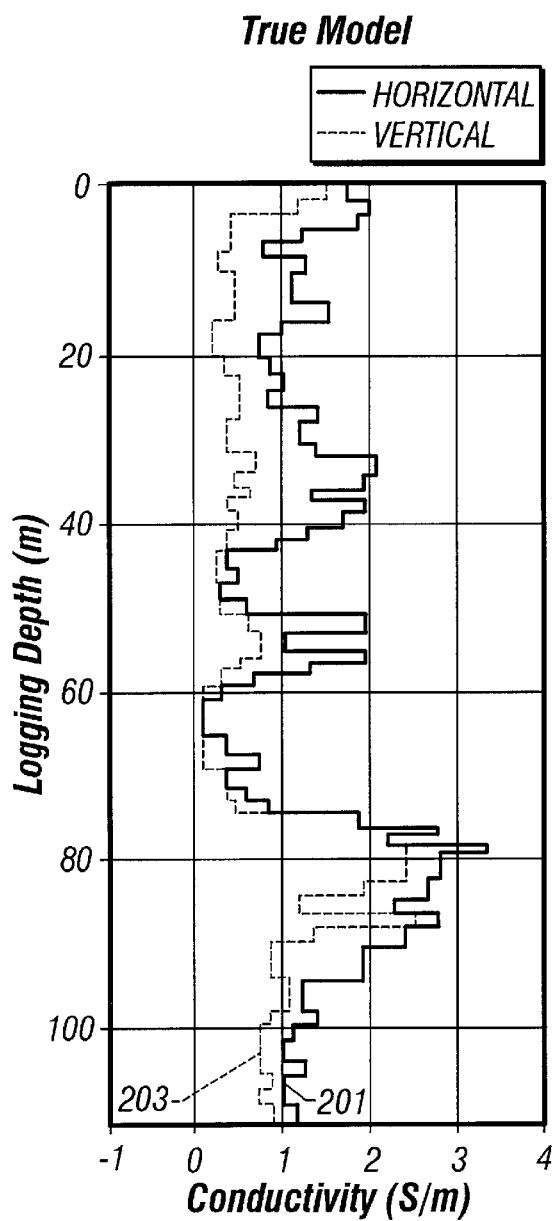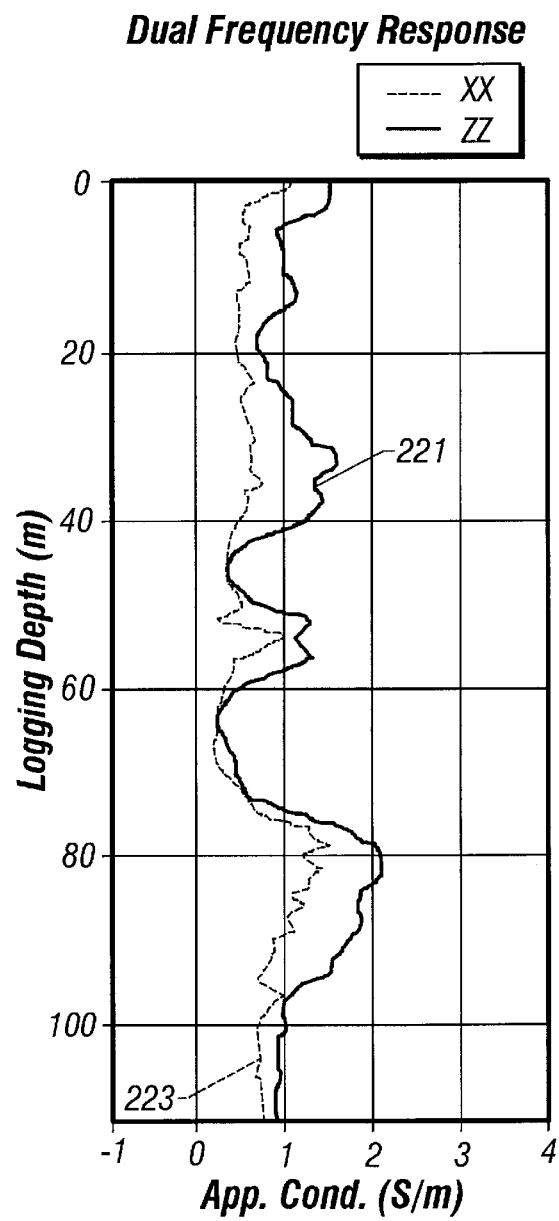
FIG. 4A
FIG. 4B

VERTICAL 1-D INVERSION WITH THIN LAYERS OF EQUAL THICKNESS

REFERENCES TO RELATED APPLICATION

This application is related to application Ser. No. 09/798,120 with the title "Using 2-D Inversion of Multi-Component Induction Logging Data to Resolve Anisotropic Resistivity Structure".

BACKGROUND OF THE INVENTION

1. Field of the Invention

The invention is related generally to the field of interpretation of measurements made by well logging instruments for the purpose of determining the properties of earth formations. More specifically, the invention is related to a method for determination of anisotropic formation resistivity using multi-component resistivity data.

2. Background of the Art

Electromagnetic induction and wave propagation logging tools are commonly used for determination of electrical properties of formations surrounding a borehole. These logging tools give measurements of apparent resistivity (or conductivity) of the formation that when properly interpreted are diagnostic of the petrophysical properties of the formation and the fluids therein.

The physical principles of electromagnetic induction resistivity well logging are described, for example, in, H. G. Doll, Introduction to Induction Logging and Application to Logging of Wells Drilled with Oil Based Mud, Journal of Petroleum Technology, vol. 1, p.148, Society of Petroleum Engineers, Richardson Tex. (1949). Many improvements and modifications to electromagnetic induction resistivity instruments have been devised since publication of the Doll reference, supra. Examples of such modifications and improvements can be found, for example, in U.S. Pat. Nos. 4,837,517; 5,157,605 issued to Chandler et al, and U.S. Pat. No. 5,452,761 issued to Beard et al.

A limitation to the electromagnetic induction resistivity well logging instruments known in the art is that they typically include transmitter coils and receiver coils wound so that the magnetic moments of these coils are substantially parallel only to the axis of the instrument. Eddy currents are induced in the earth formations from the magnetic field generated by the transmitter coil, and in the induction instruments known in the art these eddy currents tend to flow in ground loops which are substantially perpendicular to the axis of the instrument. Voltages are then induced in the receiver coils related to the magnitude of the eddy currents. Certain earth formations, however, consist of thin layers of electrically conductive materials interleaved with thin layers of substantially non-conductive material. The response of the typical electromagnetic induction resistivity well logging instrument will be largely dependent on the conductivity of the conductive layers when the layers are substantially parallel to the flow path of the eddy currents. The substantially non-conductive layers will contribute only a small amount to the overall response of the instrument and therefore their presence will typically be masked by the presence of the conductive layers. The non-conductive layers, however, are the ones which are typically hydrocarbon-bearing and are of the most interest to the instrument user. Some earth formations which might be of commercial interest therefore may be overlooked by interpreting a well log made using the electromagnetic induction resistivity well logging instruments known in the art.

The effect of formation anisotropy on resistivity logging measurements have long been recognized. Kunz and Moran studied the anisotropic effect on the response of a conventional logging device in a borehole perpendicular to the bedding plane of t thick anisotropic bed. Moran and Gianzero extended this work to accommodate an arbitrary orientation of the borehole to the bedding planes.

Rosthal (U.S. Pat. No. 5,329,448) discloses a method for determining the horizontal and vertical conductivities from a propagation or induction well logging device. The method assumes that θ, the angle between the borehole axis and the normal to the bedding plane, is known. Conductivity estimates are obtained by two methods. The first method measures the attenuation of the amplitude of the received signal between two receivers and derives a first estimate of conductivity from this attenuation. The second method measures the phase difference between the received signals at two receivers and derives a second estimate of conductivity from this phase shift. Two estimates are used to give the starting estimate of a conductivity model and based on this model, an attenuation and a phase shift for the two receivers are calculated. An iterative scheme is then used to update the initial conductivity model until a good match is obtained between the model output and the actual measured attenuation and phase shift.

Hagiwara shows that the log response of an induction-type logging tool can be described by an equation of the form $$V \propto \frac{i}{L^3}(-2e^{ikL}(1-ikL) + ikl(e^{ik\beta} - e^{ikL})) \quad (1)$$

where $$\beta^2 = \cos^2\theta + \sin^2\theta \quad (2)$$

and $$k^2 = \omega^2\mu(\in_h + i\sigma_h/\omega) \quad (3)$$

where L is the spacing between the transmitter and receiver, k is the wavenumber of the electromagnetic wave, $\mu$ is the magnetic permeability of the medium, θ is the deviation of the borehole angle from the normal to the formation, λ is the anisotropy factor for the formation, ω is the angular frequency of the electromagnetic wave, $\sigma_h$ is the horizontal conductivity of the medium and $\in_h$ is the horizontal dielectric constant of the medium.

Eq. (3) is actually a pair of equations, one corresponding to the real part and one corresponding to the imaginary part of the measured signal, and has two unknowns. By making two measurements of the measured signal, the parameters k and β can be determined. The two needed measurements can be obtained from (1) R and X signals from induction logs, (2) phase and attenuation measurements from induction tools, (3) phase or attenuation measurements from induction tools with two different spacings, or (4) resistivity measurements at two different frequencies. In the low frequency limit, $\in$ can be neglected in Eq. (3) and from known values of ω and $\mu$, the conductivity σ can be determined from k, assuming a value of $\mu$ equal to the permittivity of free space.

Wu (U.S. Pat. No. 6,092,024) recognized that the solution to eqs. (1)–(3) may be non-unique and showed how this ambiguity in the solution may be resolved using a plurality of measurements obtained from multiple spacings and/or multiple frequencies.

Strack et al. (U.S. Pat. No. 6,147,496) describe a multi-component logging tool comprising a pair of 3-component transmitters and a pair of 3-component receivers. Using measurements made at two different frequencies, a combined signal is generated having a reduced dependency on the electrical conductivity in the wellbore region.

U.S. Pat. No. 5,999,883 issued to Gupta et al, (the "Gupta patent"), the contents of which are fully incorporated here by reference, discloses a method for determination of an initial estimate of the horizontal and vertical conductivity of anisotropic earth formations. Electromagnetic induction signals induced by induction transmitters oriented along three mutually orthogonal axes are measured. One of the mutually orthogonal axes is substantially parallel to a logging instrument axis. The electromagnetic induction signals are measured using first receivers each having a magnetic moment parallel to one of the orthogonal axes and using second receivers each having a magnetic moment perpendicular to a one of the orthogonal axes which is also perpendicular to the instrument axis. A relative angle of rotation of the perpendicular one of the orthogonal axes is calculated from the receiver signals measured perpendicular to the instrument axis. An intermediate measurement tensor is calculated by rotating magnitudes of the receiver signals through a negative of the angle of rotation. A relative angle of inclination of one of the orthogonal axes which is parallel to the axis of the instrument is calculated, from the rotated magnitudes, with respect to a direction of the vertical conductivity. The rotated magnitudes are rotated through a negative of the angle of inclination. Horizontal conductivity is calculated from the magnitudes of the receiver signals after the second step of rotation. An anisotropy parameter is calculated from the receiver signal magnitudes after the second step of rotation. Vertical conductivity is calculated from the horizontal conductivity and the anisotropy parameter. One drawback in the teachings of Gupta et al is that the step of determination of the relative angle of inclination of the requires measurements of three components of data with substantially identical transmitter-receiver spacings. Because of limitations on the physical size of the tools, this condition is difficult to obtain; consequently the estimates of resistivities are susceptible to error.

The copending application Ser. No. 09/676,097, for which a continuation is filed Ser. No. 09/798,120, issued as U.S. Pat. No. 6,502,036 discusses a method of simultaneous determination of formation angle and anisotropic resistivity using a modified Marquardt-Levenberg method. The method discussed therein is an iterative procedure that is relatively time consuming.

There is a need for a fast method of determination of anisotropic resistivity that does not require measurements made with matched transmitter-receiver spacings. Such a method should preferably computationally efficient so as to provide the necessary corrections at the wellsite and in real time. The present invention satisfies this need.

SUMMARY OF THE INVENTION

The present invention is a method for the inversion of measurements made by a multicomponent logging tool to obtain a layered resistivity model. The method uses equally thin layers of equal thickness to describe the layered formation. A 1-D vertical layered forward modeling code is used to generate synthetic data. The formation resistivities are updated iteratively by using the difference between the synthetic data and the measured data without using sensitivity matrix. In a vertical well, the horizontal resistivity is inverted from the $H_{zz}$ component first and then the vertical resistivity is inverted from the $H_{xx}$ component. In a deviated well, a modification of the same methodology is applied. Synthetic examples show that the algorithm is fast and reliable. The measurements may be made by an electromagnetic logging tool having an axis inclined to the normal to the bedding planes of the formation. The logging tool includes transmitters and/or receivers with coils inclined to the axis of the tool.

BRIEF DESCRIPTION OF THE FIGURES

FIG. 3 shows the response of a single frequency tool in a multilayered anisotropic formation.

FIG. 4 shows the response of a dual frequency tool in the multilayered anisotropic formation of FIG. 3.

DETAILED DESCRIPTION OF THE INVENTION

Figure 1:
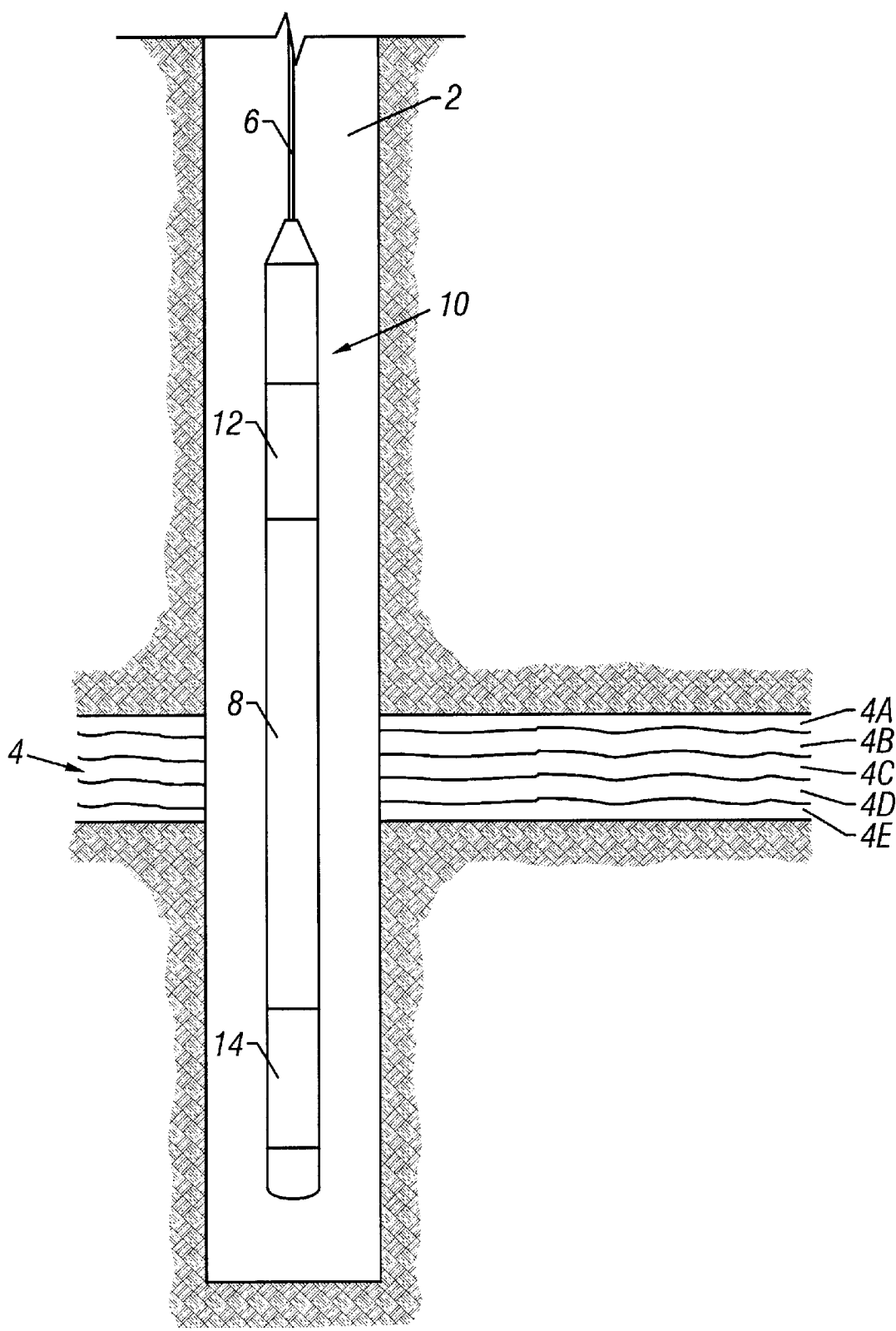
FIG. 1 shows an induction instrument disposed in a wellbore penetrating earth formations.

Referring now to FIG. 1, an electromagnetic induction well logging instrument 10 is shown disposed in a wellbore 2 drilled through earth formations. The earth formations are shown generally at 4. The instrument 10 can be lowered into and withdrawn from the wellbore 2 by means of an armored electrical cable 6 or similar conveyance known in the art. The instrument 10 can be assembled from three subsections: an auxiliary electronics unit 14 disposed at one end of the instrument 10; a coil mandrel unit 8 attached to the auxiliary electronics unit 14; and a receiver/signal processing/telemetry electronics unit 12 attached to the other end of the coil mandrel unit 8, this unit 12 typically being attached to the cable 6.

The coil mandrel unit 8 includes induction transmitter and receiver coils, as will be further explained, for inducing electromagnetic fields in the earth formations 4 and for receiving voltage signals induced by eddy currents flowing in the earth formations 4 as a result of the electromagnetic fields induced therein.

The auxiliary electronics unit 14 can include a signal generator and power amplifiers (not shown) to cause alternating currents of selected frequencies to flow through transmitter coils in the coil mandrel unit 8.

The receiver/signal processing/telemetry electronics unit 12 can include receiver circuits (not shown) for detecting voltages induced in receiver coils in the coil mandrel unit 8, and circuits for processing these received voltages (not shown) into signals representative of the conductivities of various layers, shown as 4A through 4F of the earth formations 4. As a matter of convenience the receiver/signal processing/telemetry electronics unit 12 can include signal telemetry to transmit the conductivity-related signals to the earth's surface along the cable 6 for further processing, or alternatively can store the conductivity related signals in an appropriate recording device (not shown) for processing after the instrument 10 is withdrawn from the wellbore 2.

Figure 2:
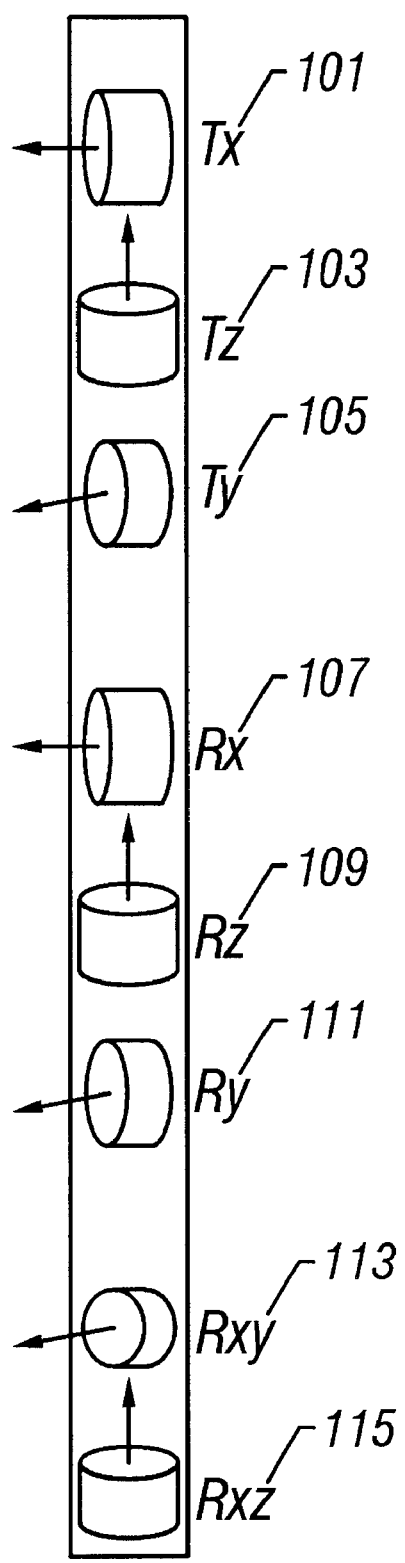
FIG. 2 shows the arrangement of transmitter and receiver coils in a preferred embodiment of the present invention marketed under the name 3DExplorer™

Turning now to FIG. 2, the configuration of transmitter and receiver coils in a preferred embodiment of the 3DExplorer™ induction logging instrument of Baker Hughes is disclosed. Three orthogonal transmitters 101, 103 and 105 that are referred to as the $T_x$, $T_z$, and $T_y$ transmitters are shown (the z-axis is the longitudinal axis of the tool). Corresponding to the transmitters 101, 103 and 105 are associated receivers 107, 109 and 111, referred to as the $R_x$, $R_z$, and $R_y$ receivers, for measuring the corresponding magnetic fields $H_{xx}$, $H_{zz}$, and $H_{yy}$. In addition, the receivers 113 and 115 measure two cross-components $H_{xy}$, and $H_{xz}$ of the magnetic field produced by the x-component transmitter.

FIG. 3 shows, on the left hand side, an anisotropic model used to illustrate the method of the present invention. The vertical axis is the depth and the horizontal axis is resistivity. The model comprises a plurality of different layers with a horizontal conductivity indicated by 201 and a vertical conductivity indicated by 203. The layers in the model have different thicknesses. This may be seen at the depth indicated, for example, by 211.

In a vertical well, the induced current of conventional $T_z$ transmitter 103 flows in the plane parallel to the bedding and the coil $R_z$ 109 is sensitive only to the horizontal conductivity. The $T_x$ transmitter 101 induces currents that flow in the plane perpendicular to the bedding and are sensitive to both horizontal and vertical conductivities. The response $H_{xx}$ of the coil $R_x$ 107 to a current in the $T_x$ transmitter 101 would be the same as the response $H_{yy}$ of the coil $R_y$ 111 to a current in the $T_y$ transmitter 105. The cross components $H_{xy}$ and $H_{yx}$ are zero. Because the patterns of the induced current in the formation are different, the $H_{zz}$ response is different from the $H_{xx}$ response.

This is shown in the right side of FIG. 3 where the curve 211 is the $H_{zz}$ response and the curve 213 is the $H_{xx}$ response. It can be seen that the $H_{zz}$ response 211 has a good correlation with the horizontal conductivity 201, but the $H_{xx}$ response 213 does not reflect the nature of the vertical conductivity 203 and even has negative values.

The situation may be improved somewhat by the use of dual frequency data. As discussed in Tabarovsky and Epov, a dual frequency response $H(f_d)$ may be obtained from two single frequency data sets $H(f_l)$ and $H(f_h)$ as $$H(f_d) = H(f_l) - \frac{f_l}{f_h} H(f_h) \quad (4)$$

where $f_l$ and $f_h$ are the lower and higher frequencies of the dual frequency data set.

FIG. 4 shows the dual frequency response of the same model. It can be seen that both $H_{xx}$ 233 and $H_{zz}$ 231 have good correlation with the true conductivities 203 and 201, but the conductivity values are still not close to the true conductivities of the model. An inversion algorithm is needed to derive the horizontal and vertical conductivities from the measured data.

Figure 5:
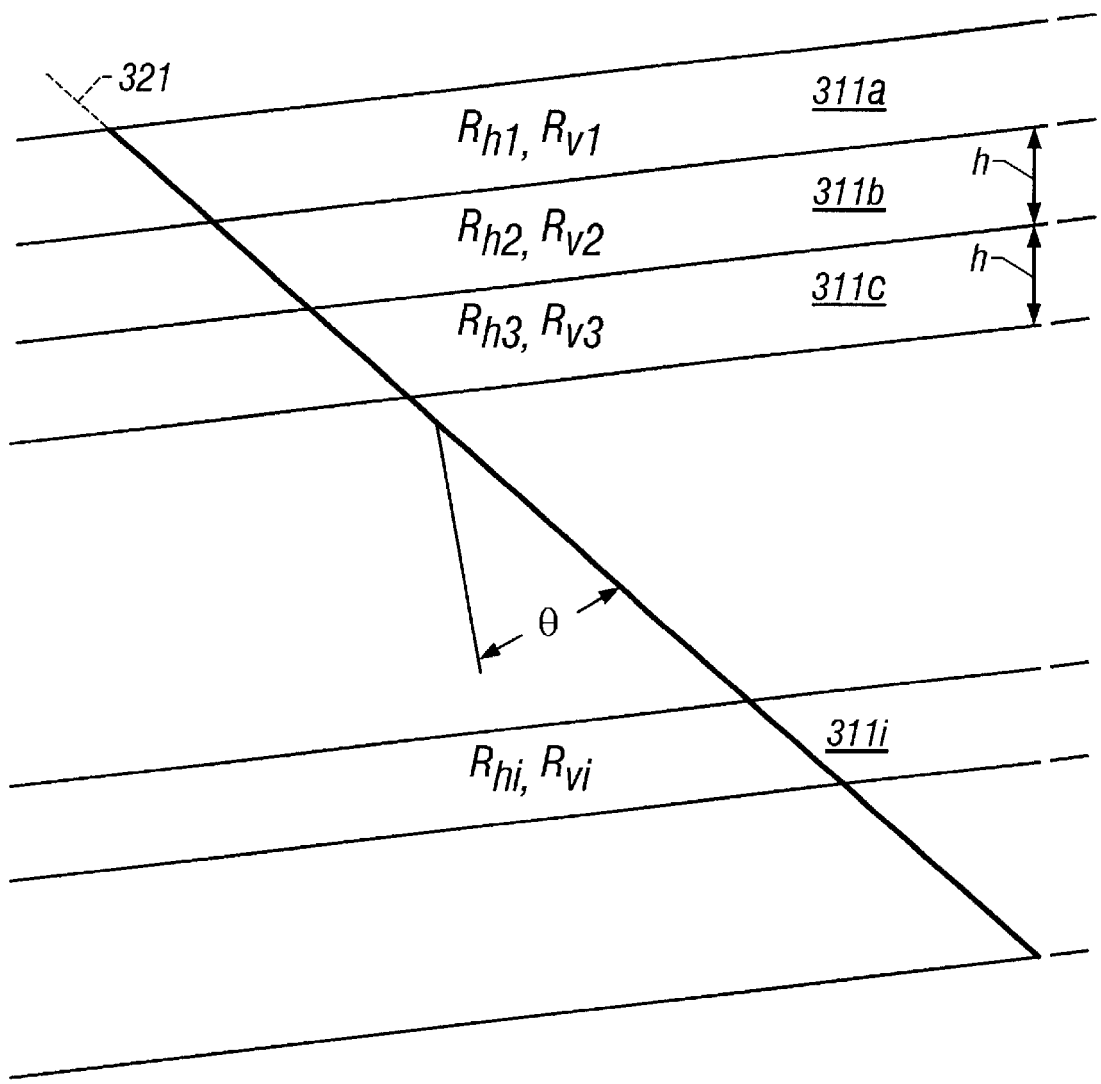
FIG. 5 shows a model used to illustrate the method of the present invention

FIG. 5 shows the model used in the present invention. The model comprises layers 311a, 311b, 311c ... 311i, ... each having the same thickness h. The horizontal and vertical resistivities are denoted by $R_{hl}$, $R_{vl}$, ... $R_{hi}$, $R_{vi}$, or equivalently, by horizontal and vertical conductivities $\sigma_{hl}$, $\sigma_{vl}$, ... $\sigma_{hi}$, $\sigma_{vi}$, with the layer boundaries inclined at an angle θ to the axis 321 of the borehole that defines the z-axis of the tool. In a preferred embodiment of the invention, the layer thickness h is set equal to one foot, typically corresponding to four data points at a normal logging speed. The average of these four measurements is associated with a measured response at the middle of the corresponding layer. In the method of the present invention, the angle θ is assumed to be a known quantity. In practice, this may be obtained by making measurements that give the relative dip of the formations. Micro-resistivity logs, dipmeters or other measurements may be used for the purpose.

Figure 6:
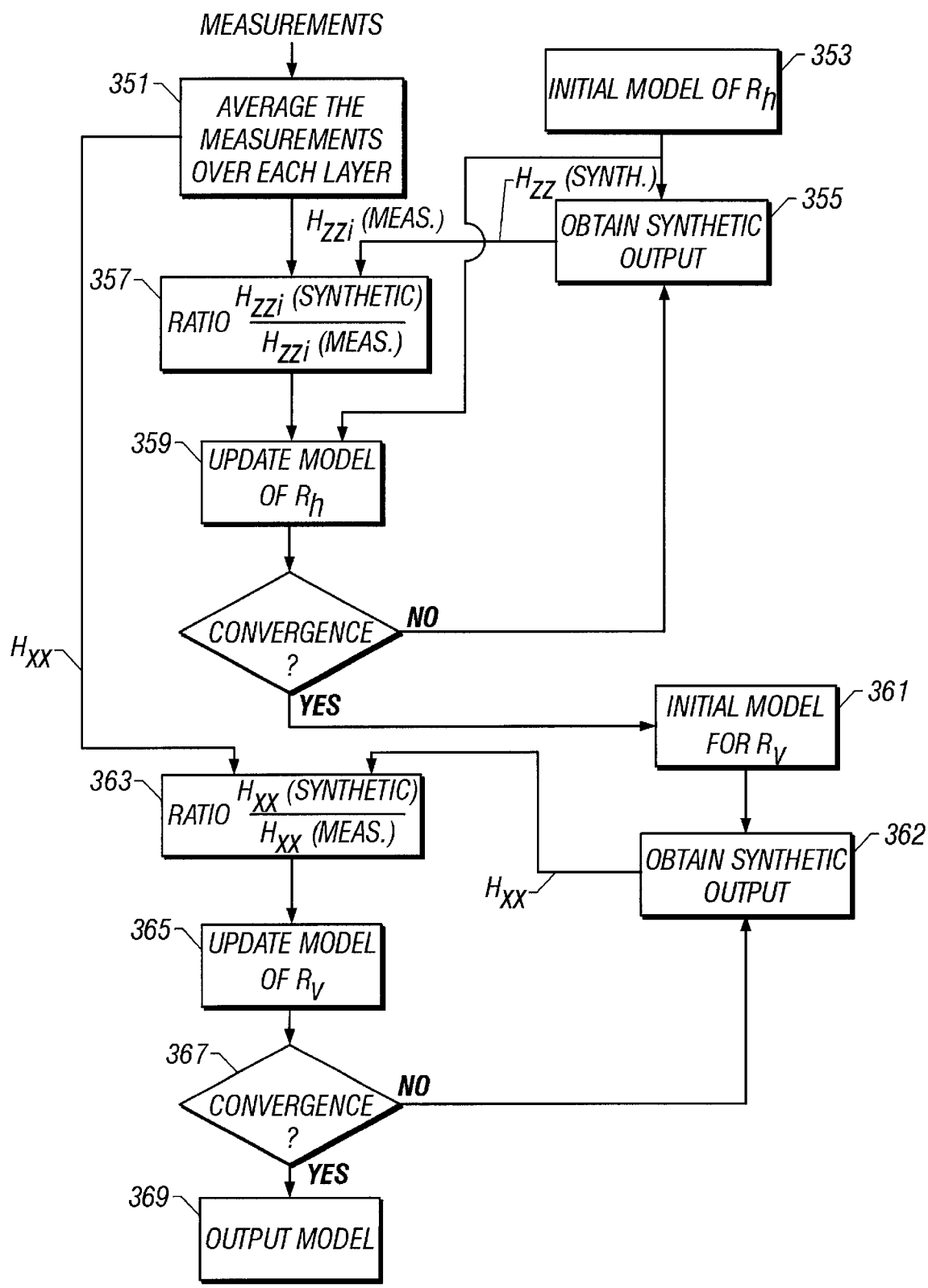
FIG. 6 shows a flow chart of an embodiment of the invention.

The method of the present invention is first described for a vertical borehole (i.e., one that is normal to the bedding plane) FIG. 6. The input measurements are averaged 351 within each layer of the initial model 353 of the horizontal resistivity to give the values of $H_{zzi}$ (measured). The synthetic output of the initial model 355 gives a value of $H_{zzi}$ (synthetic). A ratio of the synthetic to the measured values is determined 357 and from this, the horizontal resistivity model is updated using the relation from Hakvoot $$R_{hi}^{n+1} = R_{hi}^n \frac{H_{zzi}(synthetic)}{H_{zzi}(measured)} \quad (5)$$

where $H_{zzi}$ (synthetic) is a synthetic response to the model at the n-th iteration, and $H_{zzi}$ (measured) is the measured tool response (as described above corresponding to the midpoint of the i-th layer). The synthetic tool response $H_{zzi}$ (synthetic) may be obtained by any suitable forward modeling program. A check is made to see if a termination criterion for the iteration is satisfied 359. If the termination criterion is not satisfied, a new synthetic output is obtained 355 is obtained for the model and the iteration continues. If the termination criterion is satisfied, then the model for the horizontal resistivity is accepted and used as an initial model for the vertical resistivity 361. The termination criterion could be a limit on the number of iterations or some threshold on the changes in the resistivities at an iteration.

After the horizontal resistivity is obtained, the vertical resistivity model $R_{vi}^0$ is initialized 361 to be equal to the obtained horizontal resistivity model. A synthetic output $H_{xxi}$ (synthetic) for the horizontal resistivity model is determined 362 from a suitable forward modeling program, and, using a ratio 363 of $H_{xxi}$ (synthetic) to $H_{xxi}$ (measured) obtained as layer averages of the input measurements, the vertical resistivity is updated 365 by the relation $$R_{vi}^{n+1} = R_{vi}^n \frac{H_{xxi}(synthetic)}{H_{xxi}(measured)} \quad (6)$$

In eq. (6) $H_{xxi}$ (synthetic) is a synthetic response to the model at the n-th iteration, and $H_{xxi}$ (measured) is the measured tool response (as described above corresponding to the midpoint of the i-th layer). A termination check is made 369 and if the condition for termination is not satisfied, a new value of $H_{xxi}$ (synthetic) is obtained 362 and the iterations continue. If the termination condition is satisfied, then the model is output 369.

In a preferred embodiment of the invention, both the synthetic and measured values used in eqs. (5)–(6) are dual frequency values derived from eq. (4); this stabilizes the inversion process. As can be seen, the inverted values of the horizontal and vertical resistivities are very close the true values.

Figure 7:
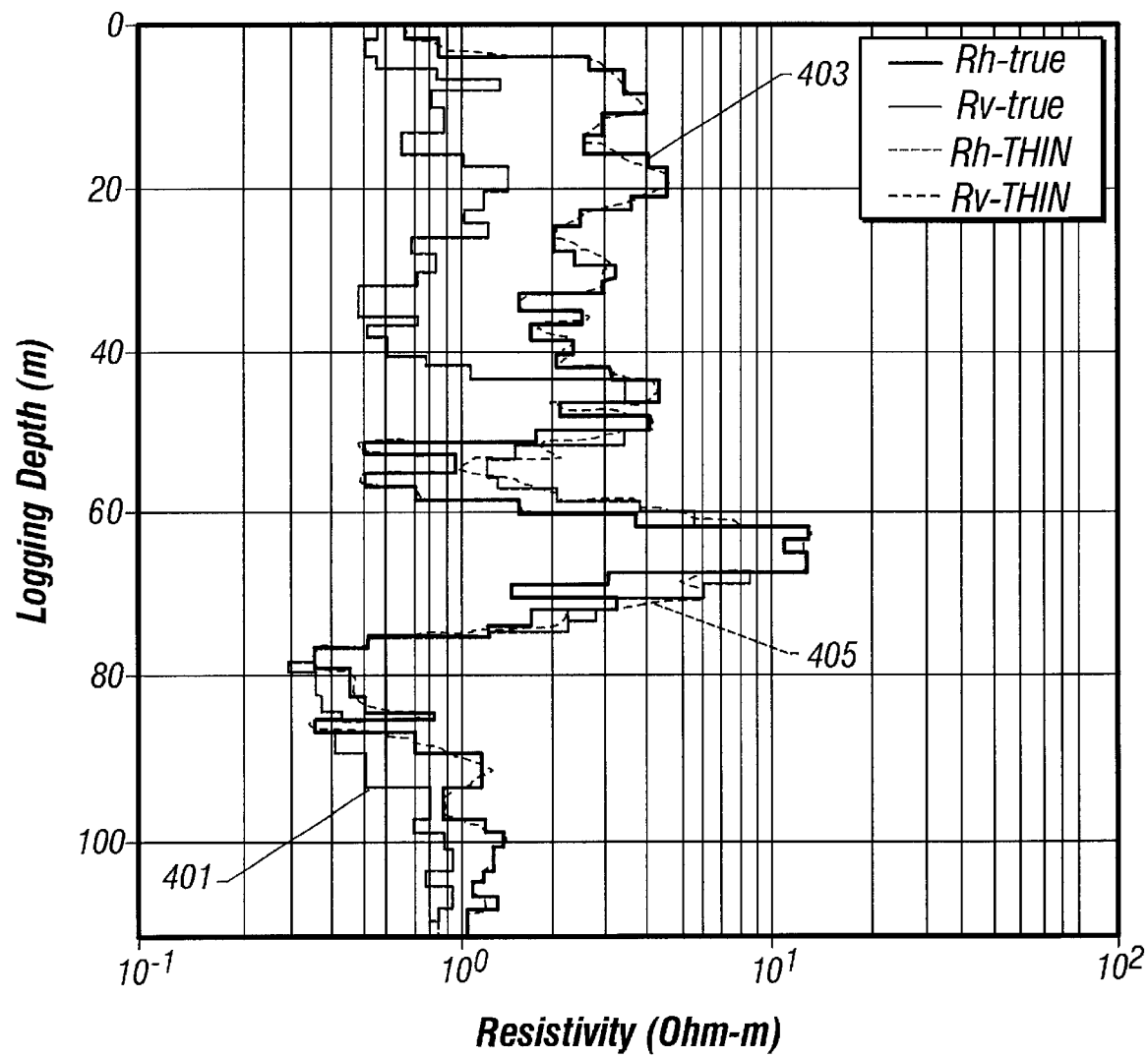
FIG. 7 shows the results of using the method of the present invention in a vertical borehole.

FIG. 7 shows the results of using the above described iterative process on the data of FIG. 4. The inversion results are plotted in terms of resistivity values rather than the conductivities shown in FIGS. 2 and 3. The actual and inverted values of the horizontal resistivity 401 are seen to be almost identical while the actual values of the vertical resistivity 403 differs only slightly from the inverted values of the vertical resistivity.

In a deviated well, the measured values of $H_{xx}$ will be different from the measured values of $H_{yy}$ because of possible rotation of the tool during the logging operation. These measured values are given by the relation:

$$H_{xx}(\theta,\phi) = H'_{xx}(\theta)\cos^2\phi + H'_{yy}(\theta)\sin^2\phi$$

$$H_{yy}(\theta,\phi) = H'_{xx}(\theta)\sin^2\phi + H'_{yy}(\theta)\cos^2\phi \qquad (7)$$

where $\theta$ is the relative dip angle and $\phi$ is the tool rotation angle, and $H'_{xx}$ and $H'_{yy}$ are independent of the tool rotation angle. The sum of the measured components $H_{xx}$ and $H_{yy}$, denoted by $H_{xxyy}$ is seen to be independent of the tool rotation angle.

$$H_{xxyy} = H_{xx} + H_{yy} = H'_{xx} + H'_{yy} \qquad (8)$$

The $H_{zz}$ response is affected by both the horizontal and vertical resistivity. The resistivity obtained by inversion of $H_{zz}$ data is a combination of the vertical and horizontal resistivities given, in a low frequency approximation by Moran and Gianzero as $$R_a = \sqrt{\frac{R_h^2 R_v}{R_h \sin^2\theta + R_v \cos^2\theta}} \qquad (9)$$

In the present embodiment, the angle $\theta$ is assumed to be known. A procedure similar to that shown in FIG. 6 is used.

Using steps equivalent to those shown at 351, 353, 355, 357 and 359, a value of $R_a$ is obtained using the $H_{zz}$ data:

$$R_{ai}^{n+1} = R_{ai}^n \frac{H_{zzi}(synthetic)}{H_{zzi}(measured)} \qquad (10)$$

In eq. (10), the synthetic response $H_{zzi}$ (synthetic) corresponds to a layered model with apparent resistivity $R_{ai}$. The determined value of $R_a$ by this iterative process is then set as the initial value for the vertical resistivity model (equivalent to 361 in FIG. 6). The vertical resistivity model is then updated using the sum of $H_{xx}$ and $H_{yy}$ from eq. (9) as $$R_{vi}^{n+1} = R_{vi}^n \frac{H_{xxyyi}(synthetic)}{H_{xxyyi}(measured)}. \qquad (11)$$

There is, however, one difference compared to the method used for vertical boreholes at step 365: as the vertical resistivity model is being updated, the horizontal resistivity model is updated at each iteration under the constraint given by eq. (9). The end result is a model of horizontal and vertical resistivities that works well for dip angles of up to 40°.

Figure 8:
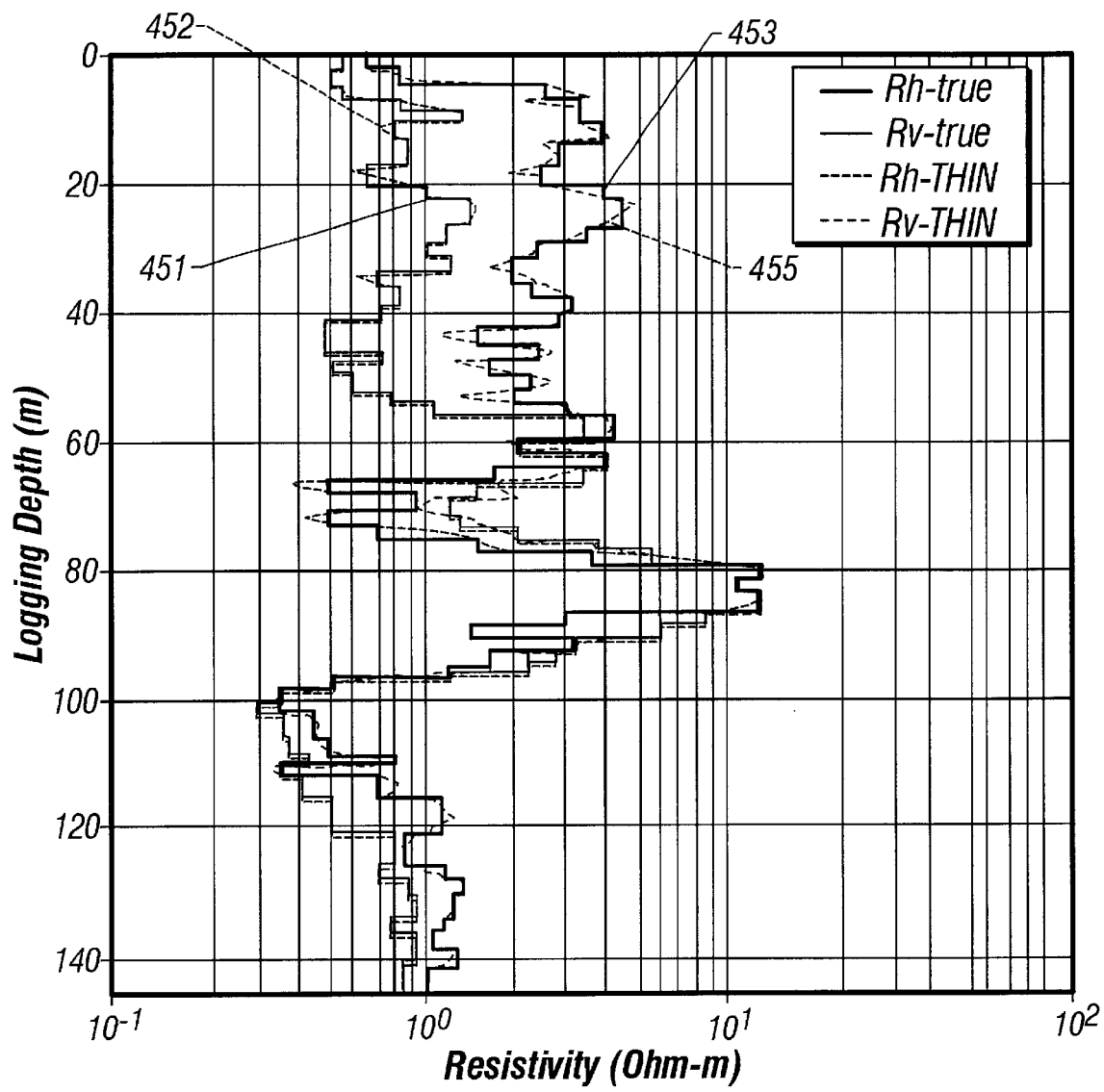
FIG. 8 shows the results of using the method of the present invention in a deviated borehole with an inclination angle of 40°.

The results of using the method given by eqs. (8)–(11) for a borehole with 40°inclination is shown in FIG. 8. There is good agreement between the true horizontal resistivity 451 and the inverted values of the horizontal resistivity 452. The agreement between the true vertical resistivity 453 and the results 455 of the inversion are not as good as in FIG. 6, but are still acceptable. Note that the display in FIG. 8 is given in terms of logging depth and not in vertical depth as in FIG. 7.

The advantages of the present method over prior art methods involving gradient methods would be recognized by those versed in the art. The number of multiplications required in each iteration for a model having n layers is of the order $O(n)$, whereas prior gradient methods such as Newton-Raphson, Marquardt-Levenberg etc. have multiplications at each iteration of order $O(n^2)$. The savings in computation times as a result of this are considerable and the present method can be used in real time to obtain an inverted resistivity model from multicomponent data.

The present invention has been discussed above with respect to measurements made by a transverse induction logging tool conveyed on a wireline. This is not intended to be a limitation and the method is equally applicable to measurements made using a comparable tool conveyed on a measurement-while-drilling (MWD) assembly conveyed on a drill string or on coiled tubing.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of logging of subsurface formations including a plurality of layers having a horizontal resistivity and a vertical resistivity, at least one of said plurality of layers having a horizontal resistivity different from the vertical resistivity, the method comprising:
   (a) conveying an electromagnetic logging tool into a borehole in the subsurface formations, said borehole substantially normal to said plurality of layers;
   (b) obtaining multi-component measurements indicative of said resistivities of said layers using said logging tool;
   (c) defining a model of said plurality of layers, said model including a horizontal resistivity and a vertical resistivity associated with each of said plurality of layers, each of said plurality of layers having a thickness,
   (d) determining components of an expected response of the logging tool to said model;
   (e) using a first component of said expected responses and a corresponding component of said measurements to give an updated model including updated horizontal resistivities;
   (f) using said updated model, a second component of said expected responses and a corresponding component of said measurements and obtaining therefrom a final model including updated vertical resistivities.

2. The method of claim 1 wherein said multi-component measurements further comprise $H_{zz}$ (vertical) and $H_{xx}$ (horizontal) components.

3. The method of claim 1 wherein the thickness of each of the plurality of layers is the same.

4. The method of claim 2 wherein the first component is the $H_{zz}$ component.

5. The method of claim 4 wherein using the first component to obtain the updated horizontal resistivities further comprises:
   (i) averaging $H_{zz}$ components of measurements in each of the plurality of layers to give an averaged $H_{zz}$ measurement for each of the plurality of layers,
   (ii) determining a ratio of the expected and averaged $H_{zz}$ measurement for each of the plurality of layers; and
   (iii) iteratively updating the vertical resistivity of each of said plurality of layers by multiplying by said ratio.

6. The method of claim 5 wherein the second component is the $H_{xx}$ component.

7. The method of claim 6 wherein using said updated model and the second component to obtain the final model further comprises:
   (i) averaging $H_{xx}$ components of measurements in each of the plurality of layers to give an averaged $H_{xx}$ measurement for each of the plurality of layers, (ii) determining a ratio of the expected and averaged $H_{xx}$ measurement for each of the plurality of layers; and (iii) iteratively updating the vertical resistivity of each of said plurality of layers by multiplying by said ratio.

8. The method of claim 7 further comprising defining an initial vertical resistivity in each of said plurality of layers to be substantially equal to the updated horizontal resistivity in said layer.

9. The method of claim 1 wherein said multicomponent measurements are dual frequency measurements derived from measurements at a first frequency $f_l$ and a second frequency $f_h$ greater than $f_l$.

10. The method of claim 9 wherein said first and second components of said expected responses are dual frequency $H_{zz}$ and $H_{xx}$ components.

11. The method of claim 10 wherein using the first component to obtain the updated horizontal resistivities further comprises:

(i) averaging the dual frequency $H_{zz}$ components of measurements in each of the plurality of layers to give an averaged dual frequency $H_{zz}$ measurement for each of the plurality of layers, (ii) determining a ratio of the expected and the averaged dual frequency $H_{zz}$ measurement for each of the plurality of layers; and (iii) iteratively updating the vertical resistivity of each of said plurality of layers by multiplying by said ratio.

12. The method of claim 11 wherein using said updated model and the second component to obtain the final model further comprises:

(i) averaging the dual frequency $H_{xx}$ components of measurements in each of the plurality of layers to give an averaged dual frequency $H_{xx}$ measurement for each of the plurality of layers, (ii) determining a ratio of the expected and the averaged dual frequency $H_{xx}$ measurement for each of the plurality of layers; and (iii) iteratively updating the vertical resistivity of each of said plurality of layers by multiplying by said ratio.

13. A method of logging of subsurface formations including a plurality of layers having a horizontal resistivity and a vertical resistivity, at least one of said plurality of layers having a horizontal resistivity different from the vertical resistivity, the method comprising:

(a) conveying an electromagnetic logging tool into a borehole in the subsurface formations, said borehole inclined at a specified angle θ to a normal to said plurality of layers;

(b) obtaining multi-component measurements indicative of said resistivities of said layers using said logging tool;

(c) defining a model of said plurality of layers, said model including a horizontal resistivity and a vertical resistivity associated with each of said plurality of layers, each of said plurality of layers having a thickness, the model further comprising an apparent resistivity for each of said plurality of layers having a predefined relationship to said vertical and horizontal resistivities and θ, (d) determining components of an expected response of the logging tool to said model;

(e) using a first component of said expected responses and a corresponding component of said measurements to give an updated model including updated apparent resistivities;

(f) using said updated model, a second component of said expected responses and a corresponding component of said measurements, said predefined relationship, and obtaining therefrom a final model including updated horizontal and vertical resistivities.

14. The method of claim 13 wherein said multicomponent measurements further comprise $H_{zz}$ (vertical), $H_{xx}$ (a first horizontal) and $H_{xx}$ (a second horizontal) components.

15. The method of claim 13 wherein the thickness of each of the plurality of layers is the same.

16. The method of claim 13 wherein the first component is the $H_{zz}$ component.

17. The method of claim 13 wherein using the first component to obtain the updated apparent resistivities further comprises:

(i) averaging $H_{zz}$ components of measurements in each of the plurality of layers to give an averaged $H_{zz}$ measurement for each of the plurality of layers, (ii) determining a ratio of the expected and averaged $H_{zz}$ measurement for each of the plurality of layers; and (iii) iteratively updating the vertical resistivity of each of said plurality of layers by multiplying by said ratio.

18. The method of claim 17 wherein the second component is a sum of the $H_{xx}$ component and the $H_{yy}$ component.

19. The method of claim 17 wherein said predefined relationship is of the form:

$$R_a = \sqrt{\frac{R_h^2 R_v}{R_h \sin^2\theta + R_v \cos^2\theta}}$$

wherein $R_a$ is the apparent resistivity, $R_v$ is the vertical resistivity and $R_h$ is the horizontal resistivity.

20. The method of claim 13 wherein said multicomponent measurements are dual frequency measurements derived from measurements at a first frequency $f_l$ and a second frequency $f_h$ greater than $f_l$, and wherein said first and second components of said expected responses are dual frequency components.

21. A method of logging of subsurface formations having a horizontal resistivity and a vertical resistivity, the method comprising:

(a) conveying an electromagnetic logging tool into a borehole in the subsurface formations, said borehole inclined at a specified angle θ to a normal to a plurality n of layers in the subsurface formations;

(b) obtaining multi-component measurements indicative of said resistivities of said plurality of layers using said logging tool;

(c) defining a model including a horizontal resistivity and a vertical resistivity associated with each of said plurality of layers, each of said plurality of layers having a thickness, the model further comprising an apparent resistivity for each of said plurality of layers having a predefined relationship to said vertical and horizontal resistivities and $\theta$, (d) determining components of an expected response of the logging tool to said model;

(e) using an iterative inversion method comprising multiplications of order $O(n)$ for obtaining from said multicomponent measurements, said components of an expected response, and said predetermined relationship, updated horizontal and vertical resistivities associated with the plurality of layers of the model;

(f) using a first component of said expected responses and a corresponding component of said measurements to give an updated model including updated apparent resistivities;

(g) using said updated model, a second component of said expected responses and a corresponding component of said measurements, said predefined relationship, and obtaining therefrom a final model including updated horizontal and vertical resistivities.

* * * * *